July 23, 1963  M. J. CORBETT  3,098,387
TURBINE
Filed Aug. 19, 1957  4 Sheets-Sheet 1

GAS INLET  GAS OUTLET

GAS INLET  GAS OUTLET

Inventor
Marshall J. Corbett
by Hill, Sherman, Meroni, Gross & Simpson Attys

July 23, 1963     M. J. CORBETT     3,098,387
TURBINE

Filed Aug. 19, 1957     4 Sheets-Sheet 2

Inventor
Marshall J. Corbett

July 23, 1963 M. J. CORBETT 3,098,387
TURBINE

Filed Aug. 19, 1957 4 Sheets-Sheet 4

Inventor
Marshall J. Corbett

United States Patent Office 3,098,387
Patented July 23, 1963

3,098,387
TURBINE
Marshall J. Corbett, Mayfield Heights, Ohio, assignor to Thompson Ramo Wooldridge Inc., a corporation of Ohio
Filed Aug. 19, 1957, Ser. No. 678,811
5 Claims. (Cl. 73—357)

The present invention relates in general to turbines and more particularly concerns a novel system in which an aerodynamically speed limited air turbine drive may be employed to provide an indication of the temperature in a gas turbine engine without the need for additional amplification. Where aerodynamically speed limited air turbine drives are used for aircraft fuel pumps, the desired temperature indication may be obtained without requiring additional equipment.

Basically an aerodynamically speed limited turbine is a turbine whose angular velocity is limited by certain aerodynamic characteristics as contrasted to turbines whose speed is limited by mechanical friction or the flow rate of input gases. One type of aerodynamically speed limited turbine has nozzle means for ejecting a fluid jet stream and a wheel having vanes movable through the path of the jet stream to receive drive thrust therefrom. With virtually all turbines of this type, the path of the jet stream discharged from the vanes shifts as the velocity of the vanes changes relative to the velocity of the jet stream. By placing baffle means in the path of the fluid discharge from the turbine vanes when the velocity of the vanes relative to the velocity of the driving jet stream lies in a limited range and by directing the flow of the stream incident upon the baffle so as to oppose the action of the main jet stream, the turbine speed may be constrained to be automatically limited within the aforesaid range.

It has been discovered that the particular limiting speed which the turbine finally reaches is a function of the temperature of the gas in the jet stream. It has further been discovered that by maintaining the ratio of the pressure of gases at the input to the turbine to the pressure of gases at the output of the turbine substantially constant, the angular velocity of the turbine is directly related to the square root of the gas temperature.

The present invention contemplates and has as a primary object the provision of means for utilizing an aerodynamically speed limited turbine to provide a temperature indication. According to the invention, the angular velocity of the areodynamically speed limited turbine is the parameter indicative of the temperature of gases which drive the turbine. In a basic form of the invention, the aerodynamically speed limited turbine is rotatably mounted within a chamber having a gas inlet and gas outlet. Means are provided for maintaining the ratio of pressure at the gas inlet to pressure at the gas outlet substantially constant.

Accordingly, another object of the invention is the provision of means for maintaining the gas inlet-gas outlet pressure ratio constant. In one aspect of the invention, this is accomplished by inserting sonic orifices in the gas inlet and outlet. In another aspect, venturi pressure taps are utilized wherein the inlet and outlet tap into a gas carrying conduit at different pressure points, the ratio of the pressures at the two tapped points remaining substantially constant.

In another form, the constant pressure ratio is maintained with a bellows actuated valve in the gas outlet.

Another object of the invention is the provision of means for deriving a parameter whose value is directly proportional to the gas temperature. This is accomplished by providing means having a parameter whose value is proportional to the angular velocity of the turbine squared. Among the forms this aspect of the invention may take are a flyball governor connected to the rotating turbine, a centrifugal pump driven by the rotating turbine, and a positive displacement pump with orifice drop.

Other features, objects and advantages of the invention will become apparent from the following specification when read in connection with the accompanying drawing in which:

FIG. 8 is a diagrammatic representation illustrating the way in which the temperature sensing means may be coupled to a gas turbine engine and provide a signal indicative of the gas temperature in the latter engine;

Figure 9:
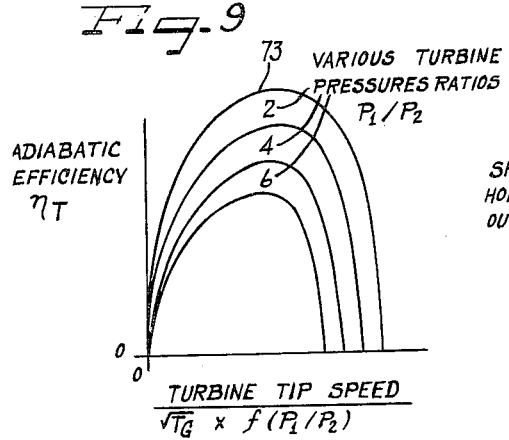
Figure 10:
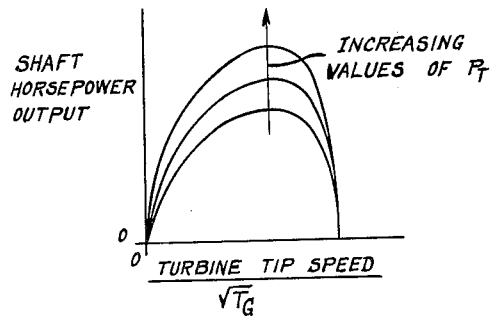

FIG. 9 graphically represents adiabatic efficiency as a function of the ratio of turbine tip speed to the product of the square root of temperature and a function of the ratio of inlet pressure to outlet pressure for various of the latter ratios; and FIG. 10 graphically represents shaft horsepower output as a function of the ratio of turbine tip speed to the square root of the gas temperature for several values of the gas inlet pressure.

Figure 1:
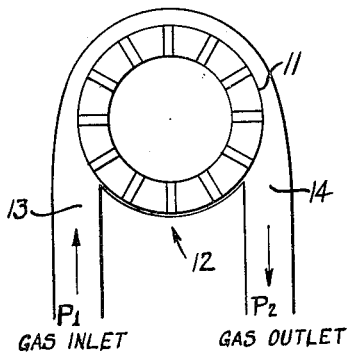
FIG. 1 is a diagrammatic plan view of an aerodynamically speed limited turbine rotatably mounted within a chamber having a gas inlet and gas outlet.

The same reference symbol designates a particular element or quantity throughout the drawing. With reference now to the drawing and more particularly FIG. 1 thereof, there is illustrated in plan view a diagrammatic representation of an aerodynamically speed limited turbine 11 rotatably mounted in a supporting chamber 12 having a gas inlet 13 and a gas outlet 14. The arrows designate the direction of gas flow, and the pressure at the inlet 13 and outlet 14 are designated $P_1$ and $P_2$, respectively. To make the turbine angular velocity a function of only the temperature, thereby permitting the latter to be determined by measuring the former, the pressure ratio $P_1/P_2$ is maintained substantially constant.

Figure 2:
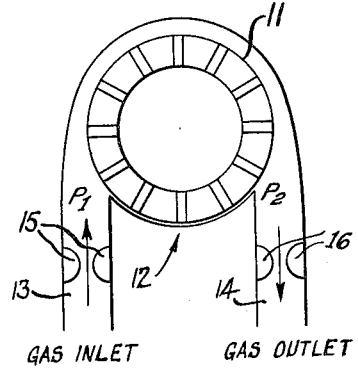
FIG. 2 is the plan view of FIG. 1 with sonic orifices in the gas inlet and gas outlet to maintain the pressure ratio between the two substantially constant.

With reference to FIG. 2, there is illustrated means for maintaining this pressure ratio constant by placing sonic orifices 15 and 16 in the gas inlet tube and gas outlet tubes 13 and 14, respectively. This arrangement is satisfactory if the pressure ratio $P_1/P_2$ is greater than substantially 4.

Figure 3:
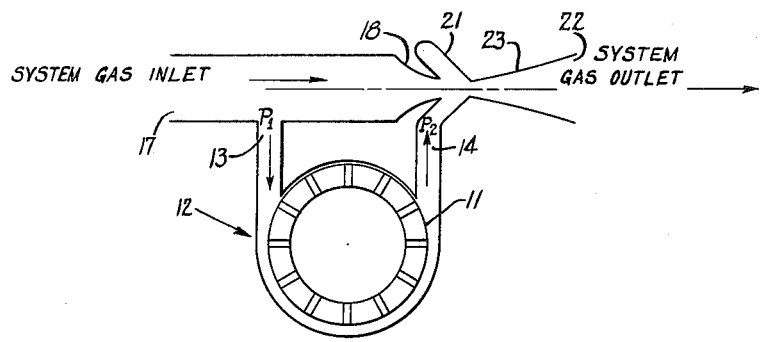
FIG. 3 is a diagrammatic plan view of the turbine rotatably mounted within the supporting housing with the gas outlet tapped at the venturi pressure tap in a gas carrying conduit while the inlet is tapped at different pressure points along the conduit.

With reference to FIG. 3, there is illustrated a venturi pressure tap system whereby a substantially constant ratio $P_1/P_2$ is obtained. A gas conduit comprises a system ags inlet 17, a tapered venturi section 18, a coupling section 21, and a system gas outlet 22 joined to the coupling section by tapered section 23. The cross-sectional opening of system gas outlet 22 is substantially the same as the cross-sectional area at system gas inlet 17; hence, since there are no gas sources or sinks therebetween, the velocity of the gas flowing through outlet 22 is substantially the same as that flowing through inlet 17.

The cross-sectional area of the gas conduit where gas inlet 13 taps in is the same as at the system gas inlet and outlet 17 and 22, respectively; hence, the velocity of the gas flow past this opening is substantially the same as the flow velocity through the latter inlet and outlet. However, since the venturi section 18 is tapered, the velocity of the gas flow through the coupling section 21 increases, and the pressure $P_2$ where gas outlet 14 joins coupling section 21 is less than the pressure $P_1$ at gas inlet 13. Moreover, the ratio of these two pressures is determined entirely by the geometrical configuration of the gas conduit and remains at all times substantially constant. This type of system is operable for obtaining the desired temperature-turbine angular velocity relation when the pressure ratio $P_2/P_1$ is greater than substantially 1.2.

Figure 4:
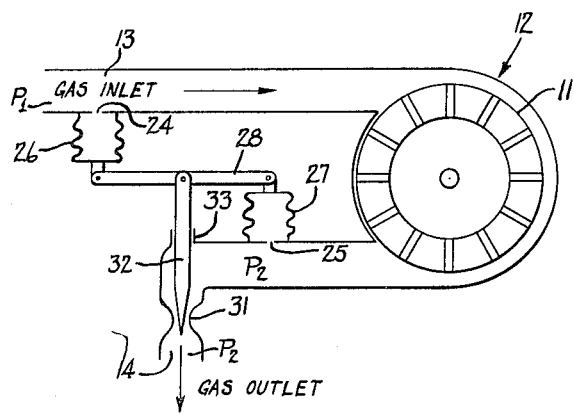
FIG. 4 illustrates a bellows actuated pressure ratio beam operatively connected to a control valve at the gas outlet to maintain the pressure ratio between gas outlet and inlet substantially constant.

Referring to FIG. 4, there is illustrated apparatus for automatically maintaining the pressure ratio $P_2/P_1$ substantially constant. In the inlet tube to the turbine and the outlet tube therefrom, there are respective openings 24 and 25 with fluid-tight bellows 26 and 27, respectively, covering these openings external to the tubes. The closed ends of bellows 26 and 27 are pivotally attached to opposite ends of a pressure ratio beam rod 28. In the outlet tube from the turbine there is a narrow neck 31 in which needle 32 may be seated to regulate the flow of gas from gas outlet 14 and consequently the pressure thereat. Needle 32 is slidable within the fluid-tight opening 33. The end of needle 32 external to the gas outlet tube is pivotally attached to rod 28. Thus, the position of needle 32 is controlled by the movement of bellows 26 and 27.

When the pressure $P_1$ increases, the bellows 26 are expanded, deflecting the rod 28 downward and forcing needle 32 further into neck 31 whereby the outward flow of gases is further restricted and the pressure $P_2$ at opening 25 is thereby increased. Under equilibrium conditions, the pressure $P_2$ at opening 25 is the same as that at gas outlet 14 since the two cross-sectional areas at these points are substantially the same. Hence, an increase in the pressure $P_1$ causes an increase in the pressure $P_2$, thus maintaining the overall pressure ratio substantially constant. The increase in pressure $P_2$ in response to an increase in pressure $P_1$ causes bellows 27 to expand and pressure ratio beam 28 to rise, thereby lifting needle 32 outward from neck 31. This reaction tends to reduce the pressure $P_2$ slightly; however, an equilibrium position is reached whereby the ratio $P_1/P_2$ remains substantially constant. This system is operable when the latter pressure ratio is approximately 2.

As indicated above, the relation between turbine angular velocity and the gas temperature is not linear. Instead, the former is directly proportional to the square root of the latter. In order to provide a parameter whose value is a direct measure of the gas temperature, means are provided having a parameter whose value is related to the square of the turbine wheel angular velocity.

Figure 5:
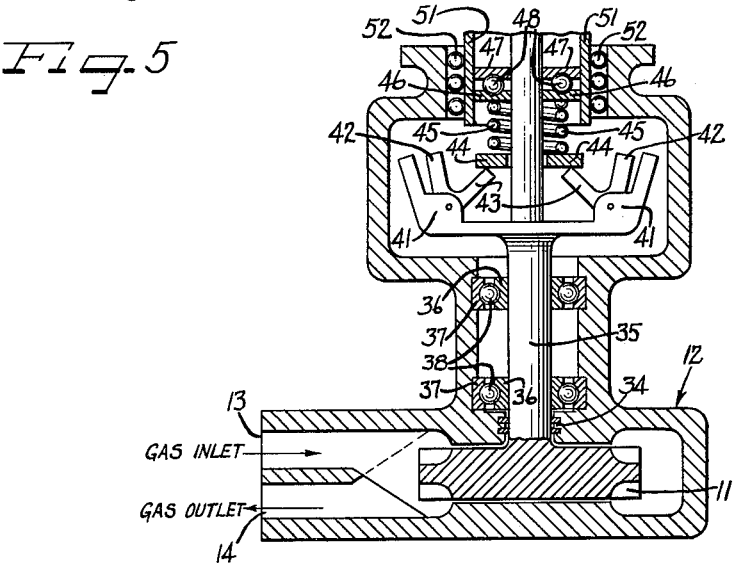
FIG. 5 is a cross-sectional drawing which illustrates the use of a flyball governor rotated by a shaft connected to the turbine wheel to provide a force directly proportional to the gas temperature.

With reference to FIG. 5, there is illustrated a system which provides a force proportional to the gas temperature by utilizing a flyball governor. The view is partially in cross-section and the turbine rotor 11 is seen within the supporting chamber 12 having gas inlet 13 and gas outlet 14 with a fluid-tight seal 34 about shaft 35 extending from turbine rotor 11. Inner races 36 extend from shaft 35 and are separated from outer races 37 by ball bearings 38. Also extending from shaft 35 are flyweight supports 41 with flyweights 42 and 43 pivotally attached to the latter supports whereby the ends of flyweights 42 and 43 move away from shaft 35 as the angular velocity of the latter increases. Flyweights 43 serve to support member 44 which is connected by a spring 45 to lower races 46 separated from upper races 47 by ball bearings 48. Inner walls 51 are separated from shaft 35 by lower and upper races 46 and 47, respectively, and from the outer wall of support housing 12 by ball bearings 52. Thus, the structure which includes inner walls 51, shaft 35, lower and upper races 46 and 47, respectively, springs 45, members 44, flyweights 42 and 43, flyweight supports 41 and shaft 35 may rotate along with turbine wheel 11 within support housing 12. A measurable force may be applied to upper races 47 to maintain its vertical position substantially constant. Thus, as the angular velocity of the shaft increases, the end of flyweight 43 moves outward and upward increasing the force on member 44 and consequently on upper race 47 whereby an increased force is required to maintain the latter race in the desired position, this force being proportional to the square of the shaft angular velocity, and consequently proportional to the gas temperature. The force on race 47, required to maintain it in position, is dependent solely on gas temperature and is independent of driving fluid velocity as well as the pressure ratio at 13, 14 which should be maintained constant by one of the methods described above. Thus a means is provided for deriving a parameter whose value is directly proportional to the gas temperature, as hereinabove set forth, such force being measured in any suitable manner, and the force may also be used as a control as hereinafter described.

Figure 6:
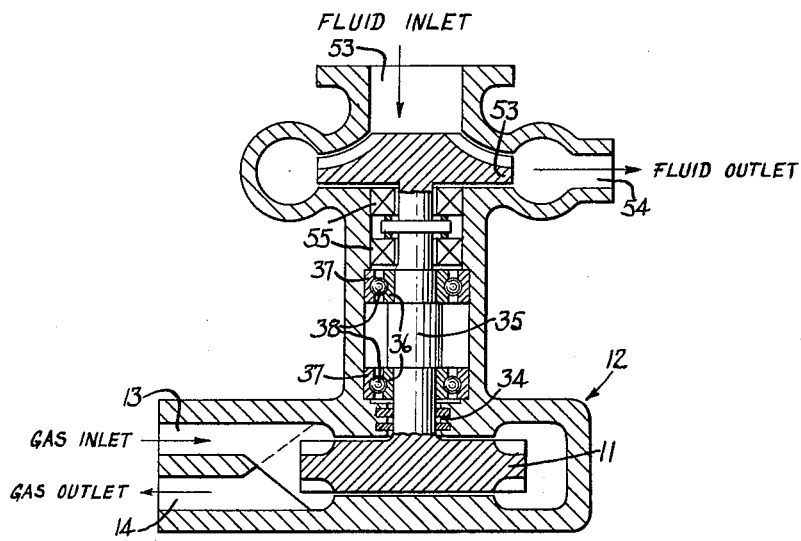
FIG. 6 is a cross-sectional drawing of a centrifugal pump driven by the shaft of the rotating turbine for providing a pressure difference between the fluid inlet and fluid outlet of the pump which is directly proportional to the gas temperature.

With reference to FIG. 6, there is illustrated a view in partial cross-section of another embodiment which provides a parameter value directly proportional to the gas temperature. This embodiment comprises a centrifugal pump wherein the pressure difference between the fluid inlet 53 and fluid outlet 54 is directly proportional to the gas temperature. Since the structure below shaft seals 55 is essentially the same as the corresponding portion described in connection with FIG. 5, the description thereof is not repeated below. Above this portion, shaft 35 drives the rotor 56 to move fluid from the fluid inlet 53 to the fluid outlet 54. The pressure difference between the fluid inlet 53 and the fluid outlet 54 is directly proportional to the gas temperature and is independent of driving fluid velocity as well as the pressure ratio at 13, 14 which should be maintained constant by one of the methods described above. The pressure difference and resultant ratio between the inlet 53 and outlet 54 may be measured in any suitable manner and, as hereinafter set forth, may also be used for control purposes.

Figure 7:
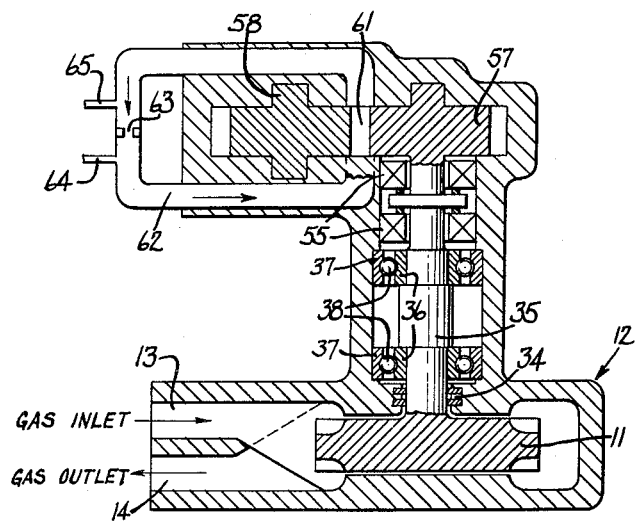
FIG. 7 is a cross-sectional drawing of a positive displacement pump with an orifice drop, the pressure difference across the orifice being directly proportional to the gas temperature.

With reference to FIG. 7, there is illustrated in a partial cross-sectional view another arrangement for deriving a parameter whose value is directly proportional to gas temperature, which parameter is the pressure differential across an orifice. In this arrangement a positive displacement pump is utilized to force fluid through the orifice. The structure of this embodiment is essentially the same as the structure of FIG. 6 below the shaft seals 55. Above this point, a gear 57 is secured to shaft 35 and meshes with another gear 58. The region 61 where the two gears mesh is within a channel 62 through which fluid flows, the velocity of the fluid flow being proportional to the angular velocity of the rotating gears, and consequently the turbine angular velocity. The fluid is forced to flow along the direction indicated by the arrow through orifice 63 within channel 62. The channel 62 communicates with opposite sides of the region 61 as shown to provide the movement of gas indicated by arrows in FIGURE 7. Although the velocity of fluid flow is directly proportional to the shaft angular velocity, the pressure differential across orifice 63 is related to the square of the fluid velocity and consequently directly proportional to the gas temperature. This pressure differential may be measured across openings 64 and 65 to obtain a reading directly proportional to the gas temperature.

Referring to FIG. 8, there is illustrated generally an arrangement which enables the embodiment of FIG. 3 to be readily adapted for use with a gas turbine engine to provide a signal indicative of the temperature of the hot gases entering the turbine. The engine comprises a turbine stator 66 and a turbine blade 67, hot gases entering the turbine stator at 68 and leaving the turbine blade at 71. A portion of the hot gases which enter the turbine stator at 68 are diverted through a gas conduit having a system gas inlet 17 and a system gas outlet 22, these being substantially the same as those bearing corresponding numerals in FIG. 3. As in FIG. 3, the gas inlet 13 taps into the conduit at a point of relatively large cross-section, while the gas outlet 14 joins the conduit at a coupling section 21 which is adjacent the venturi section 18 and the tapered section 23, both of the latter sections described above in connection with FIG. 3. With the relationship of inlet 13 to the bend of inlet 17 as diagrammatically illustrated, the pressure at inlet 13 would respond to flow velocity to some extent and inaccuracies might be produced particularly at high flow velocities. If desired, the inlet 13 might be placed at right angles to flow to obtain only a static pressure effect. Aerodynamically limited turbine sensor 72 may then be any of the structures described in FIGS. 5, 6 or 7 to provide a temperature signal which may be utilized for turbine inlet or hot gas temperature indication, as a part of a closed loop gas turbine control, wherein the operator would demand a turbine inlet temperature within safe limits and this device would serve as a sensor required to eliminate the error, or for other purposes apparent to those skilled in the art.

Having described a plurality of specific structures embodying the inventive concepts, it is appropriate to consider theoretical aspects helpful in understanding the desirable results thus obtained. Basically the phenomena involved results from the fact that the efficiency of impulse or drag type turbines returns to zero as the turbine approaches the velocity of the driving gas stream. This relationship is complicated by the fact that the velocity of the driving gas stream is not only a function of absolute gas temperature, but also of the pressure ratio in the gas stream from inlet to outlet of the turbine. However, by various means, such as those described above, the pressure ratio may be maintained constant whereby the turbine tips and consequently the turbine angular velocity is a function only of the gas temperature.

This phenomena will be better understood from the following analysis. With reference to FIG. 9, there is illustrated a graphical representation of the functional relationship between the adiabatic efficiency and the ratio of the turbine tip speed to the product of the square root of the gas stream temperature and the ratio of the pressures from inlet to outlet of the turbine designated $P_1/P_2$ for turbine pressure ratios of 2, 4 and 6. The turbine tip speed is, of course, directly related to the rotor angular velocity. If the turbine pressure ratio remains constant, then, but one curve will represent the adiabatic efficiency as a function of turbine tip speed over square root of the gas temperature, designated $T_G$. Such a curve may be curve 73.

The horsepower generated by the constant pressure ratio turbine is:

(1) $$SHP = \frac{\eta_T W a f(T_G)}{\text{constant}}$$

where $\eta_T$ = adiabatic efficiency
$Wa$ = gas weight flow
$f(T_G)$ = the gas temperature effect on available enthalpy drop Since the weight flow of air ($Wa$) through a fixed sonic turbine nozzle can be represented by the following expression, (2) $$Wa = \frac{P_T}{\sqrt{T_G}} \times \text{constant}$$

where $P_T$ = the absolute turbine gas inlet pressure.

Equation 1 above becomes:

$$SHP = \eta_T \frac{P_T}{\sqrt{T_G}} f(T_G) \times \text{constant}$$

and FIG. 9 can be redrawn in terms of shaft horsepower as in FIG. 10 wherein there is graphically represented shaft horsepower output as a function of the ratio of turbine tip speed to the square root of the gas temperature, increasing values of the absolute turbine gas inlet pressure $P_T$ being designated by the arrow. Note that at the point where the shaft horepower output returns to zero, the absolute turbine gas inlet pressure ($P_T$) has no effect on the parameter $$\frac{\text{Turbine Tip Speed}}{T_G}$$

Note also that the shaft horepower curves are vertical at their reintersection with zero efficiency. Thus, the bearing drag summed with whatever output load is used may be designed so as to have no effect on the value of the last mentioned parameter. Hence, a constant pressure ratio turbine may be designed which has an inherent speed limit functionally related only to the gas temperature and is insensitive to absolute gas pressure level and whatever drag or output power occurs. Since, as hereinabove indicated, the rotor angular velocity is related to the temperature and to the ratio of the pressure from inlet to outlet of the turbine; and since the rotor angular velocity is necessarily a function of the velocity of the driving gas stream, by maintaining the ratio of inlet and outlet pressure constant, the rate of angular rotation will be a function of the temperature. See Torell U.S. Patent 2,731,794, column 1. The previously described ratio limits of 4, 1.2, and 2 for the respective embodiment have been determined experimentally.

The apparatus described above utilizes these principles; however, the particular embodiments described herein are by way of example only, it being apparent that those skilled in the art may make numerous modifications of and departures from such structures without departing from the inventive concepts. Consequently, the invention is to be construed as limited only by the spirit and scope of the appended claims.

I claim as my invention:

1. Temperature sensitive apparatus comprising, an aerodynamically speed limited turbine rotatably mounted within a chamber having a gas inlet and a gas outlet, means for maintaining the ratio of the pressure of said gas inlet to pressure at said gas outlet substantially constant, a positive displacement pump activated by said turbine to pump fluid at a velocity proportional to the turbine angular velocity, an orifice through which said fluid is pumped, and means on either side of said orifice whereas pressure may be measured, the pressure differential across said orifice being proportional to the square of the velocity of the fluid pumped therethrough.

2. Temperature sensitive apparatus comprising, an aerodynamically speed limited turbine rotatably mounted within a chamber having a gas inlet and a gas outlet, means for maintaining the ratio for the pressure at said gas inlet to the pressure at said gas outlet substantially constant, a force displacement pump with meshed gears driven by said turbine, a closed fluid-filled channel wherein said gear mesh whereby fluid is forced through said channel at a velocity proportional to the angular velocity of said gears, an orifice within said channel through which said fluid passes, openings on either side of said orifice which enable the pressure difference thereacross to be measured, and said pressure difference being proportional to the square of the velocity of said fluid through said channel.

3. In a hot gas flow system, an aerodynamically speed-limited turbine having an inlet and an outlet, means for applying hot gas from said system to said inlet, means for maintaining a constant pressure ratio between said inlet and said outlet, and pump means driven by said turbine and arranged to produce a fluid pressure signal proportional to the square of the velocity of rotation of said turbine.

4. In a hot gas flow system, an aerodynamically speed-limited turbine having an inlet and an outlet, means for applying hot gas from said system to said inlet, means for maintaining a constant pressure ratio between said inlet and said outlet, and centrifugal pump means driven by said turbine and arranged to produce a fluid pressure signal proportional to the square of the velocity of rotation of said turbine.

5. In a hot gas flow system, an aerodynamically speed-limited turbine having an inlet and an outlet, means for applying hot gas from said system to said inlet, means for maintaining a constant pressure ratio between said inlet and said outlet, a gear pump driven by said turbine and having an inlet and an outlet, means defining a circulating fluid flow passage between said gear pump inlet and said gear pump outlet, and means defining a restriction in said passage to develop a pressure differential between points on opposite sides thereof proportional to the square of the velocity of rotation of said turbine.

References Cited in the file of this patent

UNITED STATES PATENTS

| | | |
|---|---|---|
| 2,364,810 | Noxon | Dec. 12, 1944 |
| 2,426,045 | Onsrud | Aug. 19, 1947 |
| 2,549,621 | Moore | Apr. 17, 1951 |
| 2,649,686 | Lawrence et al. | Aug. 25, 1953 |
| 2,708,343 | Brown et al. | May 17, 1955 |
| 2,731,794 | Torell | Jan. 24, 1956 |
| 2,741,919 | Gaubatz | Apr. 17, 1956 |
| 2,756,596 | Nelson et al. | July 31, 1956 |

FOREIGN PATENTS

| | | |
|---|---|---|
| 654,344 | Great Britain | June 13, 1951 |